(12) United States Patent
Bhatia

(10) Patent No.: US 7,460,542 B2
(45) Date of Patent: Dec. 2, 2008

(54) TAGGING RULES FOR HYBRID PORTS

(75) Inventor: Jagjeet Bhatia, Simi Valley, CA (US)

(73) Assignee: Alcatel Lucent, Paris (FR)

( * ) Notice: Subject to any disclaimer, the term of this patent is extended or adjusted under 35 U.S.C. 154(b) by 624 days.

(21) Appl. No.: 11/011,269

(22) Filed: Dec. 13, 2004

(65) Prior Publication Data

US 2006/0126616 A1  Jun. 15, 2006

(51) Int. Cl.
*H04L 12/28* (2006.01)
*H04L 12/56* (2006.01)

(52) U.S. Cl. ............. 370/395.31; 370/389; 370/392; 370/396; 370/401

(58) Field of Classification Search ............. 370/389, 370/392, 395.3, 395.31
See application file for complete search history.

(56) References Cited

U.S. PATENT DOCUMENTS

| | | | |
|---|---|---|---|
| 5,309,437 A | 5/1994 | Perlman et al. | |
| 6,236,659 B1 | 5/2001 | Pascoe | |
| 2002/0101868 A1 | 8/2002 | Clear et al. | |
| 2002/0131411 A1 | 9/2002 | Bhatia | |
| 2002/0191628 A1 | 12/2002 | Liu et al. | |

*Primary Examiner*—Ronald Abelson

(57) ABSTRACT

A VLAN tagging method employed in a data communications switching device is disclosed. VLAN tagging is processed in accordance with one of a plurality of VLAN tagging modes, namely, a fixed port mode, a tagged port mode, a protocol-enforced port mode, a protocol-enforced port mode, and a standards-observant mode. The fixed port mode applies a VLAN tag with a default VLAN identifier associated with the ingress port. The tagged port mode preserves the tag received with the packet, or appends a new tag with a default VLAN identifier if the incoming VLAN tag is not present. In the protocol-enforced port mode, the VLAN identifier is selected based on the protocol type of the received PDU. In the standards-observant mode, an incoming VLAN tag is retained if present, or a new tag selected based on the protocol type of the received PDU if the received packet is untagged.

8 Claims, 4 Drawing Sheets

TAGGING RULES FOR HYBRID PORTS

FIELD OF INVENTION

The invention is related to a method and apparatus for configuring ports of a data communications switching device. In particular, the invention relates to a method of integrating a plurality of virtual local area network packet tagging rules on a switch port.

BACKGROUND

Data communications switches are generally adapted to receive packets on network ports, inspect the incoming packets for virtual local area network (VLAN) tags, classify the packets in accordance with forwarding policies, and forward the packets in specified VLAN or an alternate VLAN depending on the policies. Modernly, ports are configured to respond in accordance with one of a plurality of modes including a fixed port mode, protocol-enforced port mode, or tagged port mode. If the port is configured as a fixed port, tagged and untagged packets are routed to a default VLAN associated with the port. If the port is configured as a protocol-enforced port, the incoming packets are routed to a VLAN associated with the inbound protocol whether the packets are tagged or untagged. If the port is in a tagged port mode, tagged packets entering the switch are routed to a tagged VLAN and untagged packets are routed to a default VLAN. Unfortunately, a port configured in accordance with these modes may not be able to simultaneously accommodate packets from a conventional host and tagged packets from a voice-over-Internet-Protocol (VoIP) device. If a personal computer (PC) and VoIP phone were connected to a mobility port, for example, the untagged traffic from the PC and tagged traffic from the phone are forwarded on the protocol-dependent VLAN regardless of the VLAN tag specified by phone.

In addition to the above, IEEE Std. 802.1Q and IEEE Draft Std. 802.1V define standard VLAN classification protocols. Std. 802.1Q provides two basic VLAN classification rules: (1) if an inbound packet contains a tag header having a valid VLAN identifier, assign the packet to a VLAN associated with the VLAN identifier; and (2) if an inbound packet does not contain a tag header having a valid VLAN identifier, assign the packet to a VLAN-associated with the ingress port. Like Std. 802.1Q, Std. 802.1V assigns an inbound packet having a VLAN tag to the identified VLAN if the VLAN identifier is valid. Unlike Std. 802.1Q, however, Std. 802.1V specifies that an inbound packet be assigned to a VLAN associated with the ingress port and protocol type of the inbound packet if the inbound packet does not contain a tag header having a valid VLAN identifier. Stds. 802.1Q and 802.1V also provide VLAN tagging rules for adding a tag header including an assigned VLAN identifier to a packet prior to transmitting the packet on an egress port.

Although the Standards attempt to reconcile the tagged and protocol-enforced port modes, the prior art does not address integration of the various modes to produce a "hybrid port" having modes that are standards-compliant as well as modes that are not standards-compliant. There is, therefore, a need for a hybrid port adapted to assign an inbound packet containing a tag header having a valid VLAN identifier the packet to a VLAN associated with the VLAN identifier in the packet, to a VLAN associated with the ingress port, or to a VLAN associated with a protocol type of the packet.

SUMMARY

The invention features a configurable virtual local area network (VLAN) tagging method employed in a data communications switching device. In the preferred embodiment, the method comprises the steps of: receiving a protocol data unit (PDU) on a port and determining a VLAN tagging mode associated with the port, wherein the VLAN tagging mode is selected from the group comprising: a fixed port mode, a tagged port mode, and a protocol-enforced port mode. The applicable VLAN tagging rule may then be identified based upon the VLAN tagging mode. If the fixed port mode is enabled, the applicable VLAN tagging rule calls for the default VLAN identifier associated with the port. If the tagged port mode is enabled, the received PDU is inspected for the presence of an incoming VLAN tag and the default VLAN identifier associated with the port determined if the VLAN tag is not present. If the protocol-enforced port mode is enabled, a protocol-dependent VLAN identifier associated with the protocol type of the received PDU is determined. After the applicable one or more VLAN tags are determined, the PDU is forwarded with VLAN tags in accordance with the determined tag stacking state.

In some embodiments, the switching device further supports a standards-observant mode in which the method further comprises the step of: determining if the received PDU comprises an incoming VLAN tag; if the incoming VLAN tag is present, then determining the VLAN identifier of the VLAN tag; and if the VLAN tag is not present, then determining a protocol-dependent VLAN identifier associated with a protocol type of the received PDU. The switching device may also determine a tag stacking state from the group comprising: a first state adapted to append a new VLAN tag with the determined VLAN identifier to the PDU, a second state adapted to replace the incoming VLAN tag of the received PDU with the new VLAN tag, and a third state adapted to preserve the incoming VLAN tag of the received PDU.

The invention in some embodiments features a data communications switching device comprising: a port for receiving a protocol data unit (PDU); and a classifier adapted to: determine a VLAN tagging mode associated with the port, the VLAN tagging mode selected from the group comprising: a fixed port mode, a tagged port mode, and a protocol-enforced port mode; determine a VLAN identifier based on the received PDU and determined VLAN tagging mode; determine a tag stacking state from the group comprising: a first state adapted to append a new VLAN tag with the determined VLAN identifier to the PDU, a second state adapted to replace an incoming VLAN tag of the received PDU with the new VLAN tag, and a third state adapted to preserve the incoming VLAN tag of the received PDU. The forwarding processor may then forward the PDU with one or more VLAN tags in accordance with the determined tag stacking state. The group from which the VLAN tagging mode is selected may further include a standards-observant mode.

BRIEF DESCRIPTION OF THE DRAWINGS

The present invention is illustrated by way of example and not limitation in the figures of the accompanying drawings, and in which.

DETAILED DESCRIPTION

Figure 1:
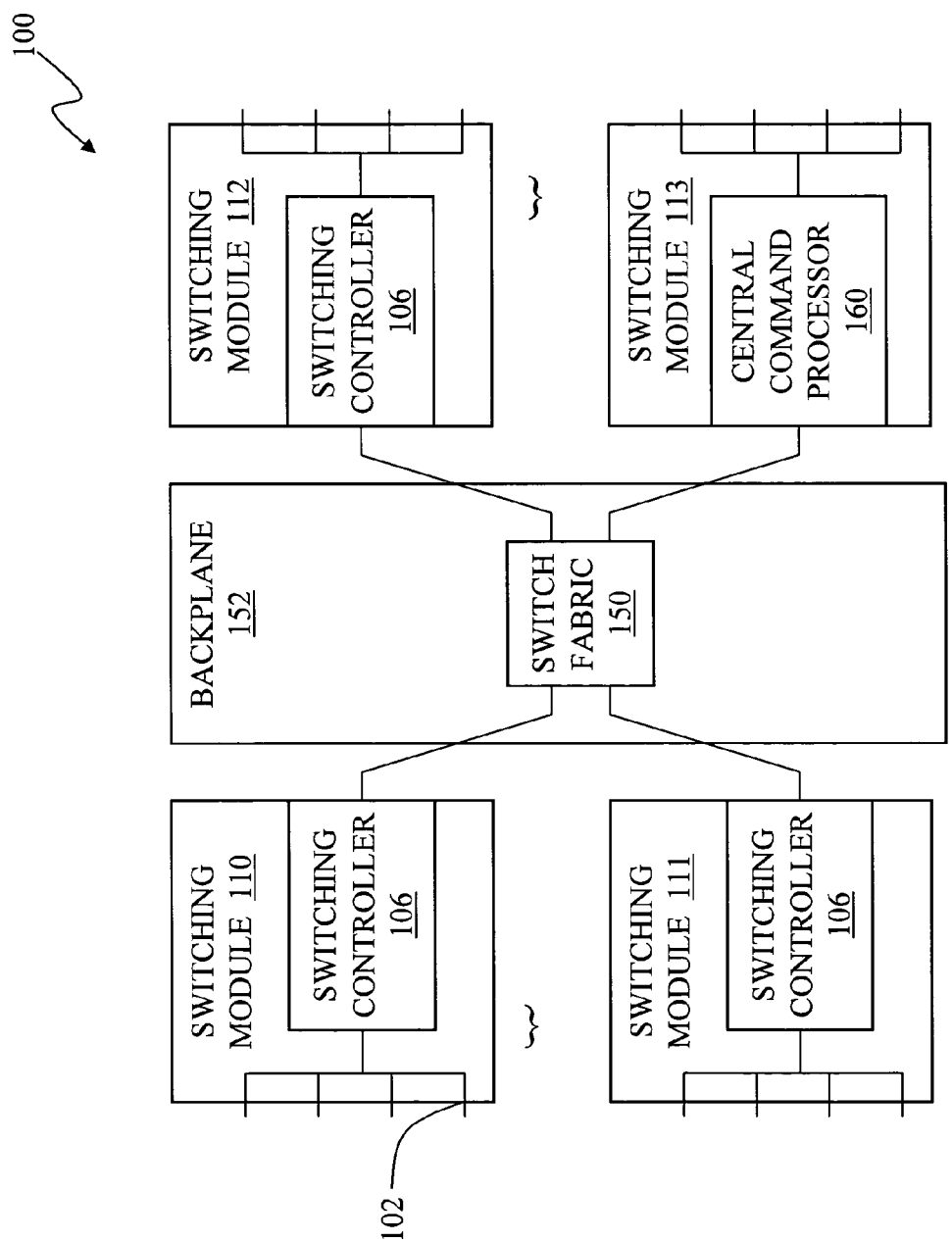
FIG. 1 is a functional block diagram of an enterprise switch, in accordance with the preferred embodiment of the present invention.

Illustrated in FIG. 1 is a functional block diagram of a multi-layer switch comprising a system of switch ports and a switch fabric. The switch 100 is one of a plurality nodes and other addressable entities operatively coupled to a data communications network embodied in a local area network (LAN), wide area network (WAN), or metropolitan area network (MAN), for example.

The switch 100 preferably comprises a plurality of switching modules 110-113, sometimes referred to as blades, which are seated into slots in the backplane 152. Each of the switching modules 110-113 preferably includes one or more external ports 102, each of the ports being operably coupled to another node in the data communications network via a communications link (not shown). Protocol Data Units (PDUs) received from the external ports 102 are transmitted to their associated switching controller 106 where forwarding operations are performed. Depending on its destination address for example, a PDU may be transmitted to an external port of another switching module via the switching fabric 150 that operably couples every switching module 110-113 to every other switching module.

The switching controller 106 is preferably capable of, but not limited to, at least Layer 2 (Data Link) and Layer 3 (Network) switching operations as defined in the Open Systems Interconnect (OSI) network model. One possible Layer 2 protocol for operably coupling the external ports 102 to a wired and/or wireless communications link is the Institute of Electrical and Electronics Engineers (IEEE) 802.3 standard, while the set of possible Layer 3 protocols includes Internet Protocol (IP) version 4 defined in Internet Engineering Task Force (IETF) Request for Comment (RFC) 791, IP version 6 defined in IETF RFC 1883, and Internetwork Packet Exchange (IPX) developed by Novell Corporation.

For purposes of this application, data flowing into a switching module 110-113 from an external port 102 toward the fabric 150 is referred to herein as ingress data which comprises ingress PDUs. The switching module through which ingress data propagates is referred to as the ingress switching module. In contrast, data flowing from the fabric 150 to an external port 102 is referred to as egress data which comprises egress PDUs. The switching module through which egress data propagates is referred to as an egress switching module. Each of the plurality of switching modules of the preferred embodiment may serve as both an ingress switching module and an egress switching module for purposes of different data flows.

The switch 100 further includes a central command processor (CMM) 160 for managing various system resources including congestion monitoring and operational assignments discussed in more detail below. In the preferred embodiment, the CMM 160 is embodied in one of the plurality of switching modules 110-113, although one of ordinary skill in the art will appreciate that the functions performed by the CMM may be executed by one or more entities incorporated in the backplane 152 and or a separate management node.

Figure 2:
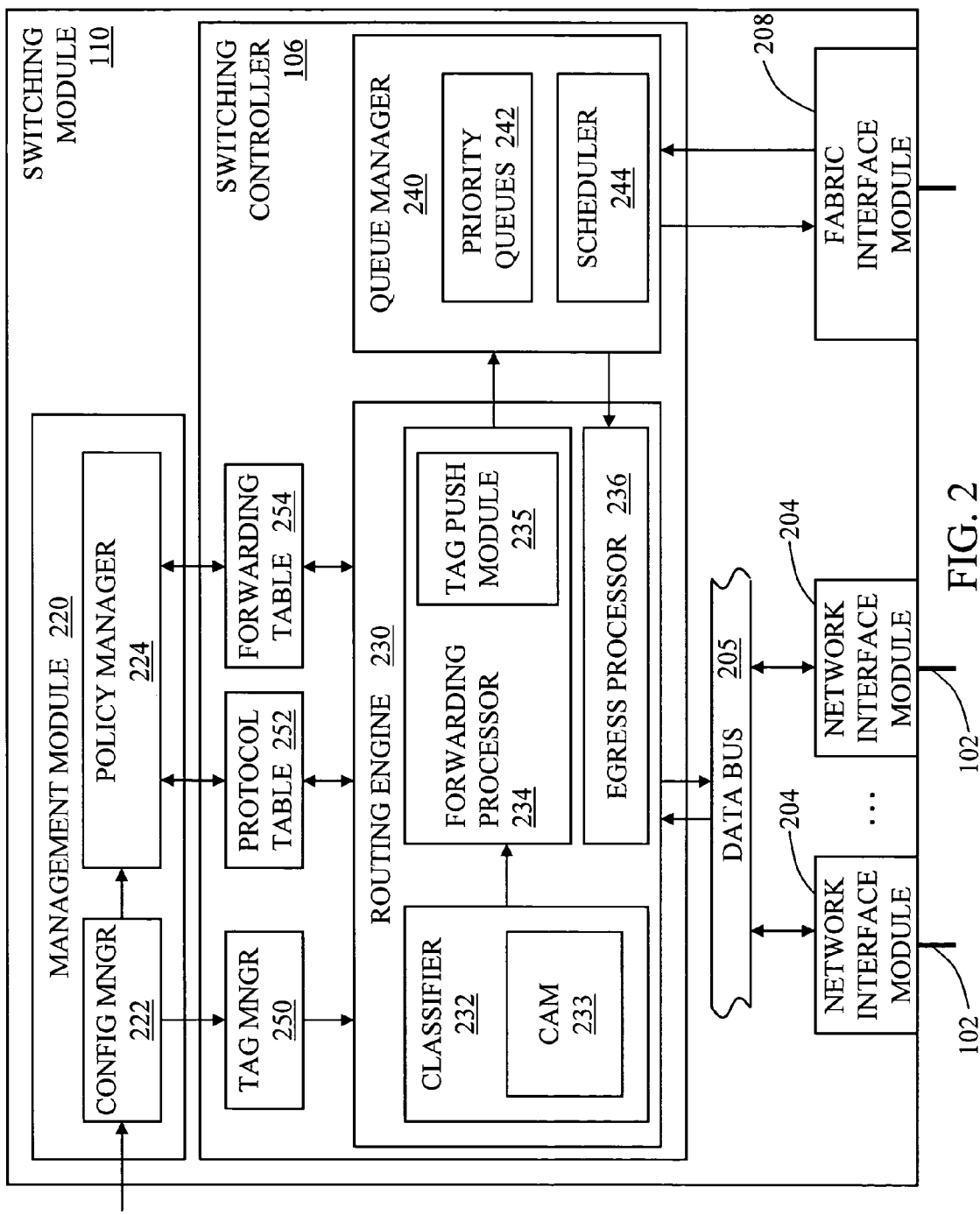
FIG. 2 is a functional block diagram of a switching module with hybrid ports for performing mode-selectable tagging, in accordance with the preferred embodiment of the present invention.

Illustrated in FIG. 2 is a functional block diagram of a switching module with which the preferred embodiment may be implemented. The switching module 110 of the preferred embodiment preferably comprises one or more network interface modules (NIMs) 204 including one or more external ports 102, a routing engine 230, a queue manager 140, and a management module 220.

The PDUs of the ingress and egress traffic are conveyed between the plurality of NIMs 204 and routing engine 230 via one or more internal data buses 205. The routing engine 230 of the preferred embodiment comprises a classifier 232 and a forwarding processor 234, and an egress processor 236. The classifier 232 is adapted to inspect fields of ingress PDU and retrieve the criteria used to identify the flow to which the PDU belongs. In the preferred embodiment, the PDU properties retrieved from the from a PDU may include the source and or destination addresses, protocol types, and priority information, for example, depending on the port mode discussed in more detail below. The PDU properties are then used to search the content addressable memory (CAM) 233 for purposes of matching the PDU properties to one of a set of flow categories defined by a network administrator via the management module 220. Once a match is detected, the classifier 232 preferably retrieves the destination address information, mode-dependent virtual local area network (VLAN) information, and egress port, which are then transmitted to the forwarding processor 234.

The forwarding processor 234 preferably prepares the ingress PDU for transmission from the egress port using the destination address information and mode-dependent VLAN information. A unicast frame with a known Layer 2 destination address matched in the CAM 233 is preferably switched to the egress port of the appropriate egress switching module. If the destination address unknown, however, the frame is generally broadcast on all external ports 102 except the one on which the frame was received. If the PDU includes an Internet Protocol (IP) packet with the destination address of a node in another network domain, the forwarding processor searches known IP addresses and encapsulates the packet in a new Layer 2 header including the next-hop address in the direction of the destination. The PDUs of the ingress flow are then passed from the forwarding processor 234 to the queue manager 140 where they are buffered in priority queues 242 prior to transmission by the scheduler 144 to the switch fabric (not shown) via the fabric interface module 208.

In addition to the ingress processing described above, the routing engine 230 also processes egress traffic received from the switch fabric 150. In particular, the routing engine 230 further includes an egress processor 236 for transmitting egress PDUs received from the switching fabric 150 to the designated egress port 102 among the NINMs 204. In the case of the ingress buffered switch of the preferred embodiment, the egress switching modules performs only minimal buffering operations before transmitting the PDU.

In accordance with the preferred embodiment, the routing engine 230 is adapted to apply one of more VLAN tags, preferably IEEE 802.1Q compliant tags, to the ingress PDUs of a particular external port as a function of a user-selectable tag mode. A mode may be selected or otherwise changed by the tag manager in response to a mode selection signal received from a user interface (not shown) via the configuration manager 222.

The mode select is implemented on a per-port basis, thus allowing each port to be individually configured depending on the host devices coupled to the port. When a switching module is adapted to dynamically change the VLAN tagging rules for an external port, the ported is referred to herein as a hybrid port.

There a four user-selectable tag modes in the preferred embodiment including a standards-observant mode, a fixed tag mode, a VLAN tag mode, and a protocol-enforced port mode. In the standards-observant mode, the routing engine 230 preserves an existing VLAN tag of an ingress tagged PDU, but appends a new VLAN tag in accordance with the PDU's protocol type if the ingress PDU is untagged. If the PDU's protocol type does not match a known protocol, then the switch 100 appends a new VLAN tag associated with default VLAN assigned by the network administrator for the port. In the fixed mode, the routing engine 230 applies a VLAN tag having the same VLAN identifier (VID) to every ingress PDU. In the VLAN tag mode, the routing engine 230 appends a VLAN tag to the ingress PDU in accordance with the default VLAN associated with the port. In the protocol-enforced port mode, the routing engine disregards any existing VLAN tag, if present, and inserts a new VLAN tag in accordance with the protocol type of the PDU. If the standards-observant mode or the protocol-enforced port mode is enabled, the protocol type is used as an index into the protocol table 252 to retrieve the appropriate VID associated with the flow identified by the protocol type.

Figure 3A:
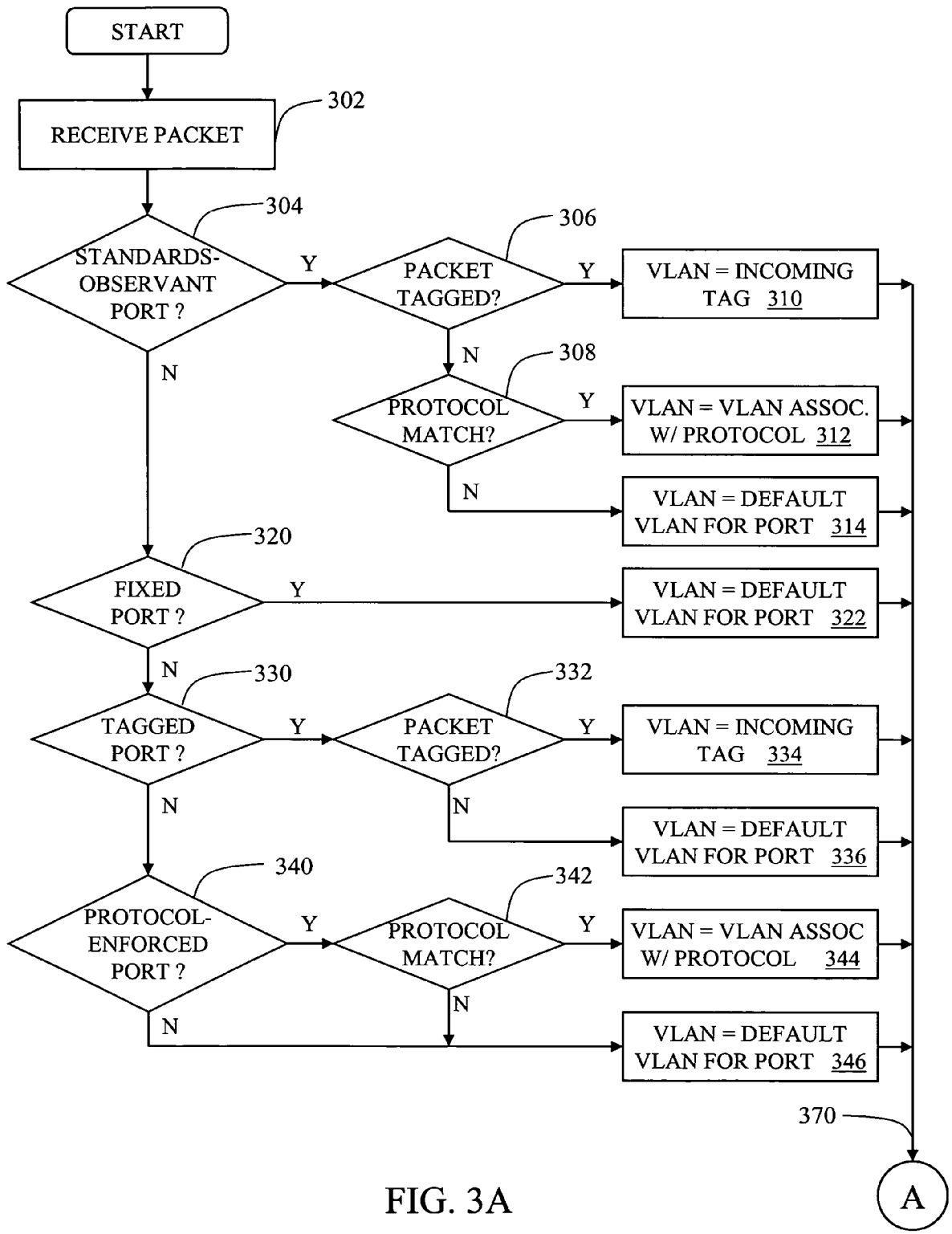
FIGS. 3A and 3B is a flowchart of the method of implementing a hybrid port with multiple tagging modes, in accordance with the preferred embodiment of the present invention.
Figure 3B:
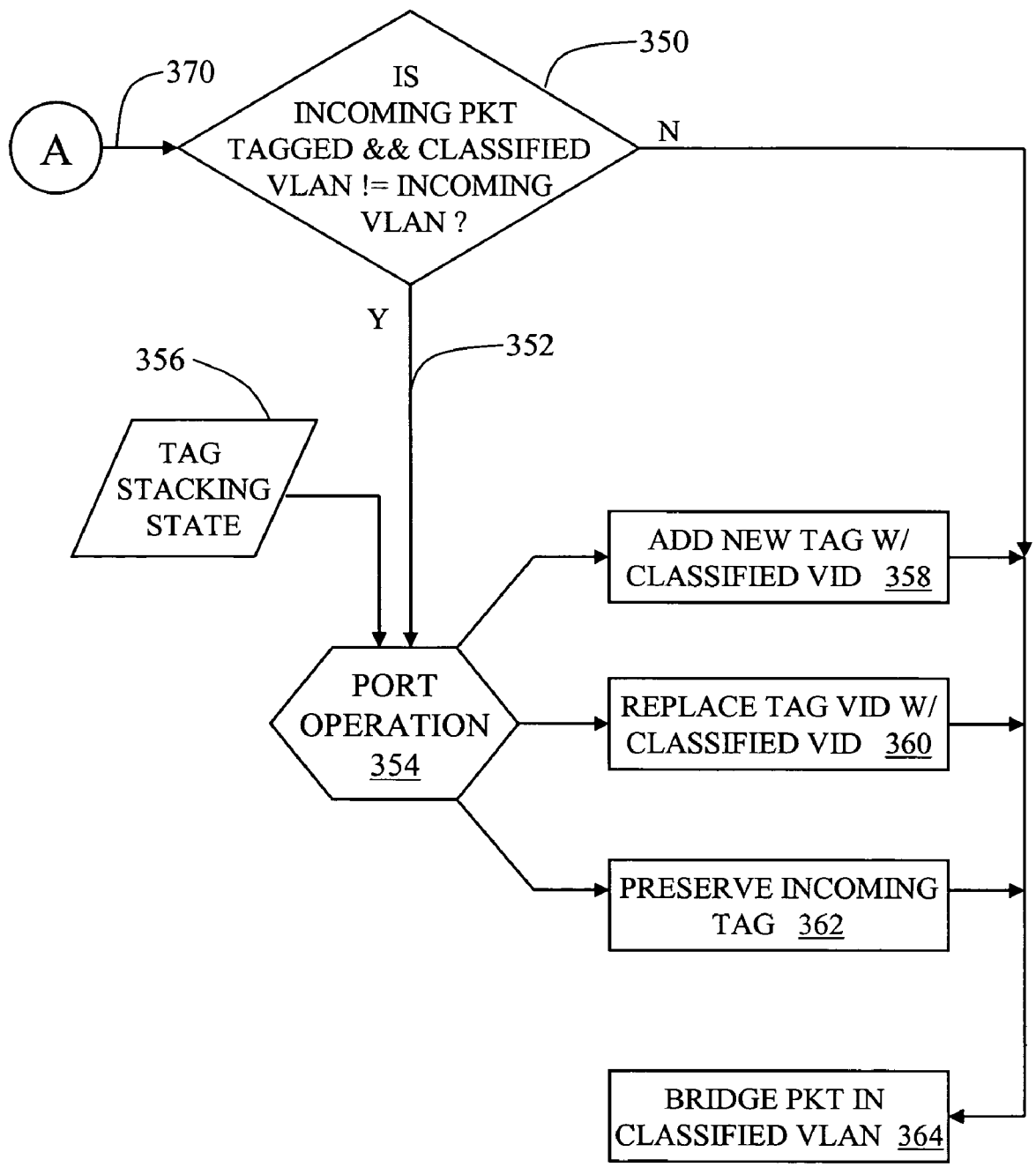

Illustrated in FIGS. 3A and 3B is a flowchart of the method of implementing a hybrid port with multiple tagging modes. The one of the plurality of tagging modes enabled at any given time is programmably determined by the user on a per port basis. In the preferred embodiment, the tagging mode for any of the ports may be dynamically changed at the discretion of the user.

Upon receipt (302) of an ingress PDU, the set of one or more tagging rules to apply is determined by the state of the port, that is, which mode of plurality of modes with which the hybrid port is enabled. When the hybrid port is configured in the standards-observant mode, the standards-observant determination step (304) is answered in the affirmative and the routing engine 230 inspects each ingress PDU received to determine whether the PDU has an existing VLAN tag. If a VLAN tag, e.g., an 802.1Q tag, is present, the tagged packet determination step (306) is answered in the affirmative and the existing VLAN tag preserved (310). In the absence of a VLAN tag, the tagged packet determination step (306) is answered in the negative and the routing engine 230 searches the protocol table 252 to match the PDU protocol type extracted from the PDU. If the protocol is matched, the protocol searching step (308) is answered in the affirmative and a VLAN tag with the applicable VID is appended (314) to the PDU. If the protocol is not matched, a new tag with the default VID associated with the port is appended (322) to the PDU. The first default is defined for or otherwise associated with the particular port in the standards-observant mode.

When the hybrid port is configured in the fixed tag mode, the fixed tag determination step (320) is answered in the affirmative and the routing engine 230 appends (322) a VLAN tag having the default VID associated with the hybrid port to the one or more PDUs received at the hybrid port. If the fixed tag determination step (320) is answered in the negative, the hybrid port continues to identify the applicable port state. The second default VID is defined for or otherwise associated with the hybrid port when enabled with the fixed tag mode.

When the hybrid port is configured in the VLAN tag mode, the VLAN tagging determination step (330) is answered in the affirmative and the routing engine 230 inspects the packet for the presence of a VLAN tag. If the VLAN tag is present, the tagged packet determination step (332) is answered in the affirmative and the PDU with the incoming VLAN tag transmitted (334) to those external ports of the switch 100 associated with the VLAN. In the absence of an incoming VLAN tag, the routing engine 230 appends (336) a VLAN tag with the default VID associated with the particular port. The PDU is subsequently transmitted to the egress port or ports associated with the third default VLAN.

When the hybrid port is configured in the protocol-enforced port mode, the protocol-enforced port determination step (340) is answered in the affirmative and the routing engine 230 searches the protocol table 252 for the VLAN associated with protocol type of the ingress PDU. If a match is detected, the protocol determination step (342) is answered in the affirmative and a VLAN tag with the retrieved VID appended (344) to the PDU—in accordance with the tag stacking state discussed below—prior to transmission to the associated egress ports. If the protocol type is unknown and a match not detected, the protocol determination step (342) is answered in the negative and a VLAN tag with the default VID is appended (346) to the PDU.

After the new VLAN is determined in accordance with the appropriate VLAN tagging mode, the switch 100 proceeds 370 to arbitrate, if necessary between the new VLAN tag and the incoming tag of the received PDU. In particular, if the ingress PDU possesses and inbound tag that is different than the new tag determined in a preceding step, switch 100 determines which tag with which to forward the PDU. If the VID of the new VLAN tag and incoming PDU are different, the tag arbitration testing step (350) is answered in the affirmative and the switch 100 proceeds to the port operation mode selection 354. Depending on the tag stacking state 356 assigned by the network administrator, the hybrid port either appends (358) the new tag with the new classified VID to the PDU so as to encapsulate the existing tag, replaces (360) the existing outer most VLAN tag by replacing the existing VIED with the newly determined VID, or elects to preserve (362) the inbound VLAN tag over the new VLAN tag. After the new tag information is incorporated into PDU, if applicable, the PDU is forwarded (364) in the appropriate VLAN towards each egress port associated with the VLAN.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A virtual local area network (VLAN) tagging method in a data communications switching device, the method comprising the steps of:
   receiving a protocol data unit (PDU) on a port with the port operable in at least 1 of at least 3 VLAN tagging modes;
   determining the VLAN tagging mode associated with the port; and
   if the determination is made that the port is operating in a first of the at least 3 VLAN tagging modes, then determining a default VLAN identifier associated with the port;
   if the determination is made that the port is operating in a second of the at least 3 VLAN tagging modes, then:
      determining if the received PDU comprises an incoming VLAN tag,
      if the incoming VLAN tag is present, then determining the VLAN identifier of the VLAN tag, and if the VLAN tag is not present, then determining the default VLAN identifier associated with the port; and if the determination is made that the port is operating in a third of the at least 3 VLAN tagging modes, then determining a protocol-dependent VLAN identifier associated with the protocol type of the received PDU.

2. The VLAN tagging method of claim 1, wherein the port is operable in at least 1 of at least 4 VLAN tagging modes then:

if the determination is made that the port is operating in a fourth of the at least 4 VLAN tagging modes;

determining if the received PDU comprises an incoming VLAN tag, if the incoming VLAN tag is present, then determining the VLAN identifier of the VLAN tag, and if the VLAN tag is not present, then determining a VLAN identifier associated with a protocol type of the received PDU.

3. The VLAN tagging method of claim 1, wherein the method further comprises the step of determining a tag stacking state from the group consisting of: a first state adapted to append a new VLAN tag with the determined VLAN identifier to the PDU, a second state adapted to replace the incoming VLAN tag of the received PDU with the new VLAN tag, and a third state adapted to preserve the incoming VLAN tag of the received PDU.

4. The VLAN tagging method of claim 3, wherein the method further includes the step of forwarding the PDU with one or more VLAN tags in accordance with the determined tag stacking state.

5. A virtual local area network (VLAN) tagging method in a data communications switching device, the method comprising the steps of:

receiving a protocol data unit (PDU) on a port with the port operable in at least 1 of at least 4 VLAN tagging modes;

determining a VLAN tagging mode associated with the port;

determining a VLAN identifier associated with the received PDU and determined VLAN tagging mode;

determining a tag stacking state from the group comprising: a first state adapted to append a new VLAN tag with the determined VLAN identifier to the PDU, a second state adapted to replace an incoming VLAN tag of the received PDU with the new VLAN tag, and a third state adapted to preserve the incoming VLAN tag of the received PDU; and forwarding the PDU with one or more VLAN tags in accordance with the determined tag stacking state.

6. The VLAN tagging method of claim 5, wherein the step of determining the VLAN identifier in the first of the at least 4 VLAN tagging modes comprises the steps of:

determining whether the received PDU comprises the incoming VLAN tag; and if the received PDU does not comprise the incoming VLAN tag, then determining a protocol-dependent VLAN identifier associated with a protocol type of the received PDU.

7. The VLAN tagging method of claim 6, wherein the step of determining the VLAN identifier in the second of the at least 4 VLAN tagging modes comprises the steps of:

determining whether the received PDU comprises the incoming VLAN tag; and if the received PDU does not comprise the incoming VLAN tag, then determining a default VLMJ identifier associated with the port.

8. The VLAN tagging method of claim 7, wherein the step of determining the VLAN identifier in the third of the at least 4 VLAN tagging modes comprises the steps of determining a protocol-dependent VLAN identifier associated with a protocol type of the received PDU.

* * * * *